Dec. 15, 1970  H. J. SCHWERDHÖFER  3,546,970
DUAL-SPEED BICYCLE HUB WITH CENTRIFUGALLY
CONTROLLED GEAR SHIFT
Filed May 22, 1969

United States Patent Office 3,546,970
Patented Dec. 15, 1970

3,546,970
DUAL-SPEED BICYCLE HUB WITH CENTRIFUGALLY CONTROLLED GEAR SHIFT
Hans Joachim Schwerdhöfer, Schweinfurt (Main), Germany, assignor to Fichtel & Sachs A.G., Schweinfurt (Main), Germany
Filed May 22, 1969, Ser. No. 826,949
Claims priority, application Germany, June 8, 1968, 1,755,682
Int. Cl. F16h 1/04, 3/02
U.S. Cl. 74—752                            4 Claims

ABSTRACT OF THE DISCLOSURE

A bicycle hub having a planetary drive transmission and two overrunning clutches which connect the planet carrier or the ring gear of the transmission to the hub shell is controlled by a flyweight on a support rotated by the hub shell in the same direction, but at higher speed. The clutch on the ring gear is normally disengaged by a control ring connected to the ring gear by a friction coupling. A similar coupling connects a shifting sleeve to the hub shell. The sleeve and ring are threadedly connected so that the ring moves axially on the axially secured sleeve when they rotate at different speeds. The sleeve is drivingly engaged by the flyweight at high wheel speeds.

BACKGROUND OF THE INVENTION

This invention relates to automatically shifting multiple speed hubs for the wheels of bicycles and like vehicles, and particularly to a hub having at least two speeds and controlled by a centrifugal governor in response to the rotary speed of the wheel and of the hub.

Conventional hubs of the type described have a planetary gear transmission arranged in the shell of the hub which is coaxially mounted on a shaft. The transmission is drivingly interposed between an input wheel or chain sprocket and the hub shell and includes two transmission members which are connected for rotation at different speeds, such as a planet carrier and a ring gear, when the input wheel is turned. Two overrunning clutches are respectively associated with the two transmission elements and interposed between the same and the hub shell for driving the latter at two different speeds. A centrifugal governor operates one of the overrunning clutches for this purpose.

The governor has a flyweight mounted on a support which is rotated about the hub axis by a step-up transmission connected to the hub shell to permit a reduction in the size of the flyweight. A further reduction in the flyweight size has been made possible by a known arrangement in which the flyweight merely turns a shifting member, and threaded engagement between the shifting element and a control member causes the latter to move axially in the hub to thereby disengage one of the aforementioned overruning clutches when the flyweight rotates fast enough so that centrifugal forces acting on the weight overcome the restraint of a biasing spring, and the weight moves away from its axis of rotation.

This invention aims at improving the afore-described multiple-speed hub.

SUMMARY OF THE INVENTION

In the improved hub of the invention, the step-up transmission rotates the flyweight support in the same direction as the hub shell, and the flyweight engages the shifting member for rotating the latter at the speed of the support when the flyweight moves away from the hub axis. The shifting member is axially secured and yieldably coupled to the hub shell. The rotatable and axially movable control member is yieldably coupled to the ring gear in the planetary drive transmission, and the shifting and control members are threadedly connected in such a manner that the control member disengages the overrunning clutch associated with the ring gear when the shifting member is rotated by its yieldable coupling at the lower speed of the hub shell, while the control member permits engagement of the last mentioned clutch when the shifting member is driven by the flyweight at a speed which is higher than that of the ring gear.

Additional features, further objects, and many of the attendant advantages of this invention will readily become apparent from the following detailed description of a preferred embodiment when considered in connection with the appended drawing.

DESCRIPTION OF THE PREFERRED EMBODIMENT

Figure 1:
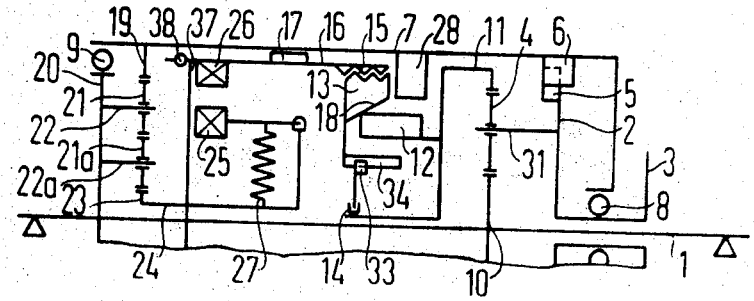
FIG. 1 shows one half of a two-speed hub of the invention in axial, rear-elevational section, by conventional symbols, the hub being in low gear.
Figure 2:
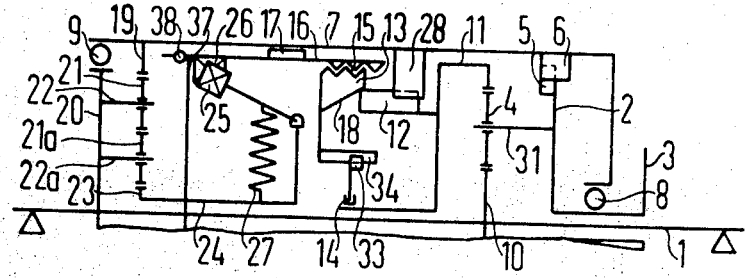
FIG. 2 illustrates the hub of FIG. 1 in high gear.

Referring now to the drawing in detail, and initially to FIGS. 1 and 2, there is seen a rear wheel hub for a bicycle whose shaft 1 is normally fixedly fastened to the bicycle frame. A planet carrier 2 rotatably supported on the shaft 1 is integral with a sprocket 3 normally driven by a chain on the right side of the bicycle and carries planet gears 4 on respective shafts 31, only one of the three planet gears being shown. The planet carrier 2 also carries two diametrically opposite pawls 5 which are held in engagement with a rim of ratchet teeth 6 on the hub shell 7 by a pawl spring, not shown in FIGS. 1 and 2 and conventional in itself. The hub shell 2 rotates about the axis of the shaft 1 on ball bearings 8, 9, the ball bearing 8 being interposed between the shell 7 and the planet carrier 2.

The planet gears 4 simultaneously mesh with a sun gear 10 fixed on the shaft 1 and with a ring gear 11 so as to turn the latter about the axis of the shaft 1 at a speed higher than the input speed of the hub, that is, the speed of the sprocket 3 on the planet carrier 2. Rotation may be transmitted from the ring gear 11 to the hub shell 7 by means of pawls 12 on the ring gear 11 which are spring-biased toward engagement with a ratchet 28 on the hub shell 7. Engagement between the pawls 12 and the ratchet 28 is prevented in the low-gear condition of FIG. 1, and permitted in the high-gear condition of FIG. 2 by a control ring 13.

Figure 4:
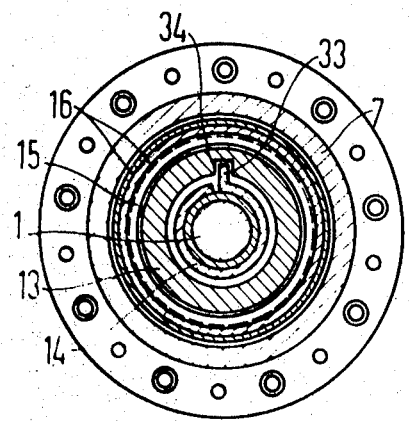
FIGS. 4 and 5 show the hub of FIG. 3 in radial sections on the lines IV—IV and V—V respectively.

The control ring 13 is coupled to the ring gear 11 by a friction spring 14 which is coiled about a cylindrical face of the ring gear and has a free end 33 which radially projects from the cylindrical face of the ring gear into an axial groove 34 in an inner face of the ring 13, as is best seen in FIG. 4. External, coarse, left-handed threads 15 on the ring 13 engage corresponding inner threads of a shifting sleeve 16 which is yieldably coupled to the hub shell 7 by a leaf spring 17 attached to the sleeve and frictionally engaging the hub shell. A frustoconical face 18 on the control ring 13 engages the pawls 12 in the axial ring position illustrated in FIG. 1 to pivot the pawls away from the ratchet 28, and the pawls are engaged with the ratchet by an associated, nonillustrated pawl spring, when the control ring 13 moves on the threads 15 away from the pawls 12 into the position of FIG. 2.

In the position of the control ring 13 shown in FIG. 1, the hub shell 7 is turned by the pawls 5 at the same rotary speed as the input sprocket 3. In the position of the control ring illustrated in FIG. 2, the hub shell 7 is rotated at the higher speed of the ring gear 11 by the pawls 12, and the ratchet teeth 6 overtravel the pawls 5.

The control ring 13 is shifted axially between the two illustrated positions by a centrifugal governor driven by the hub shell 7 through epicyclic step-up gearing. An internal gear rim 19 on the hub shell 7 drives intermediate meshing gears 21, 21a. A bearing member 20 which is fixed on the shaft 1 and carries the afore-mentioned ball bearing 9 also supports the shafts 22, 22a of the intermediate gears 21, 21a, the gear 21 meshing with the gear rim 19 and the gear 21a, and the latter meshing with the central gear 23 of the step-up gearing.

The central gear 23 is fixed on a tubular support 24 which rotates on the shaft 1 and carries a flyweight 25 pivotally mounted on the support 24 so as to swing away from the shaft 1 at a wheel speed sufficient to overcome the restraint of a return spring 27. In its operative position remote from the shaft 1, the flyweight 25 engages an abutment 26 on the shifting sleeve 16. The sleeve is normally taken along by the spring 17 at the speed of the hub 7, but turns faster when the flyweight 25 engages the abutment 26.

Axial movement of the sleeve 16 toward the drive end of the hub near the sprocket 3 is prevented by abutting engagement of a washer 37 on the axially fixed flyweight support 24 and of a spring ring 38 on the sleeve 16.

Figure 3:
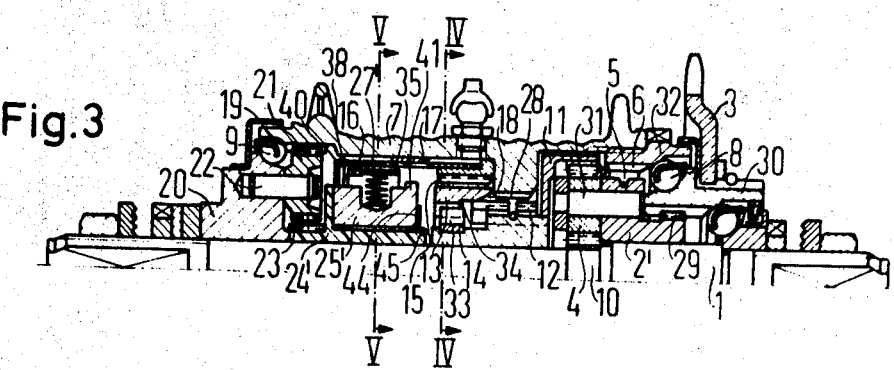
FIG. 3 illustrates an actual embodiment of the same hub in axial section and in low gear.
Figure 5:
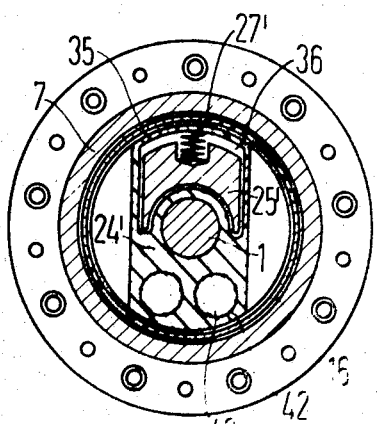

An actual embodiment of the hub of FIGS. 1 and 2 is shown in FIGS. 3 to 5. Minor structural details have been simplified in FIGS. 1 and 2 for convenient pictorial representation. The hub illustrated in FIGS. 3 to 5 thus is as described above except as explicitly stated otherwise hereinbelow.

It would not be practical to assemble a hub in which the input sprocket is integral with the planet carrier of the planetary transmission in the hub shell. The actual sprocket 3 is fixedly mounted on a tubular driver 30 which rotates on the shaft 1 and is connected to a separate planet carrier 2' by interengaged radial projections and recesses 29.

The annular outer race member 32 of the ball bearing 8 is threadedly inserted in the shell 7 and integrally carries the sprocket teeth 6 engaged by the pawls 5.

The flyweight 25' is radially slidable in the cavity 36 of a plastic housing 24', as is best seen in FIG. 5. The housing 24' is rotatably mounted on the shaft 1 and is the functional and structural equivalent of the afore-described flyweight support 24. It is integral with the central gear 23. The helical compression spring 27' which normally holds the weight 25 near the shaft 1 in the housing 24' is interposed between the weight 25' and a circumferential outer wall 35 of the housing 24'. The flat, circular washer 37 is axially movable on the housing 24' between the axial end of the wall 35 and the spring ring 38 on the sleeve 16.

The split spring ring 38 is a piece of spring wire bent into a generally circular shape from which four integral lugs or lobes project in a radially outward direction. The lugs or lobes are arcuate sections of the wire having a much smaller radius of curvature than the ring as a whole. The ring 38 is fastened to the sleeve 16 by engagement of the lugs or lobes with openings 40 in the sleeve.

The mass of the single flyweight 25' is balanced by two cylindrical metal rods 43 fixedly arranged in axial bores 42 in the portion of the housing 24a which is diametrically opposite the cavity 36. The housing 24a which supports the flyweight 25' is axially fixed on the shaft 1 by a washer 44 and a snap ring 45. The washer is wide enough to retain the flyweight 25' in the cavity 36 which is open in an axial direction toward the sprocket 3. The end of the flyweight 25' near the washer 44 axially projects beyond the wall 35 of the housing 24' and has a radially outwardly directed cam-shaped projection 41.

The hub is automatically shifted between the low-speed position of FIGS. 1 and 3–5 and the high-speed position of FIG. 2 in the following manner.

As long as the nonillustrated wheel rim and the hub shell 7 rotate at a relatively low speed at which centrifugal forces acting on the flyweight 25' cannot overcome the restraint of the spring 27', the pawls 12 are disengaged by the control ring 13. The ring is rotated at the high speed of the ring gear 11 by the friction spring 14, and the shifting sleeve 16 is turned by the spring 17 at the slower speed of the hub 7 in such a direction that the ring 13, if it was initially positioned otherwise, is moved toward the right, as viewed in FIGS. 1 to 3, into the position of FIG. 1. The pawls 12 are swung out of engagement with the ratchet 28, and the axial forces of reaction acting on the sleeve 16 are transmitted to the shaft 1 by the spring 38, the washer 37, and the housing 24'. No axial stresses are exerted on the hub shell 7, and the rotation of the wheel is therefore not impeded by high bearing pressure.

When the pawls 12 are fully disengaged and cannot be swung further by the ring 13, the spring 17 slips on the hub 7 or the spring 14 slips on the cylindrical portion of the ring gear 11, wherever the friction is lower.

When the wheel rotates at a speed high enough to cause radial outward movement of the flyweight 25' in the housing 24', the projection 41 on the flyweight 25' frictionally engages the shifting sleeve 16, and the sleeve is taken along at the rotary speed of the housing 24' which is higher than that of the hub shell 7, the shell and the housing rotating in the same direction so that the spring 17 slips on the hub shell. The rotary speed of the housing 24' is also higher than that of the ring gear 11 and of the control ring 13 so that the ring 13 travels axially on the threads 15 toward the left, as viewed in FIGS. 1 to 3, into the position shown in FIG. 2. The pawls 12 are released, and the hub shell 7 is turned at the relatively high speed of the ring gear 11, thereby further increasing the rotary speed of the sleeve 16 and safely holding the control ring 13 in the pawl-releasing position of FIG. 2.

The flyweight 25' reverts to the position shown in FIG. 1 when the wheel speed drops until centrifugal forces acting on the flyweight 25' cannot overcome the restraint of the spring 27'. The traveling speed at which the hub automatically shifts from low gear into high gear can be set by suitably selecting the spring 27'. The return from high gear to low gear is not determined solely by the position of the weight 25'. As long as driving torque is transmitted from the pawls 12 to the sprocket 28, the pawls remain engaged because of the conventional sawtooth shape of the sprocket teeth, not specifically illustrated in the drawing. The hub 7 thus continues rotating at the same speed as the ring gear 11, and the sleeve 16 rotates at the same speed as the control ring 13. The low-gear condition of the hub is restored only when pedaling is momentarily interrupted, thereby slowing or stopping the planetary gearing so that the ratchet 28 on the hub shell 7 rotates faster than the pawls 12 which are disengaged. When pedaling is resumed, the ring gear 11 rotates faster than the hub shell 7 and the ring 13 is shifted into the position of FIG. 1 as described above.

The rider may thus select the moment at which the hub shifts from high into low gear if the wheel speed is sufficiently low. Frequent unnecessary shifting back and forth between low gear and high gear is avoided, and riding comfort is improved because of the absence of the slight shock occurring when an automatic transmission of the general type described shifts from high gear into low gear without the cooperation of the rider.

The hub illustrated in FIGS. 3 to 5 relies for shifting into high gear on the engagement of a friction coupling between the shifting sleeve 16 and the flyweight 25', more specifically the projection 41 on the flyweight. Under otherwise identical condition, the torque capable of being transmitted by this coupling is a direct function of the mass of the flyweight 25'. It is essential in a bicycle hub to reduce the hub volume to a minimum, and therefore to make the flyweight as small as possible.

This requirement is met in the illustrated hub in part by the fact that the power required for shifting is derived from the hub shell directly and the friction coupling in the centrifugal governor merely has to overcome friction in the threads 15, the inertia of the threadedly connected elements 13, 16, and the friction of the spring 17 against the hub shell 7 while the sleeve 16 rotates faster than the hub shell.

In the instant invention, the hub shell 7 and the shifting sleeve 16 rotate in the same direction in all operative conditions of the hub because of the even number of intermediate gears 21, 21a in the step-up transmission for the housing 24' which supports the flyweight 25'. The spring 17 is fixedly attached to the shifting sleeve 16 and extends obliquely in a circumferential and radial direction toward the inner wall of the hub shell 7 in such a manner that the free end of the spring which is in contact with the shell 7 trails when the sleeve 16 turns faster than the hub shell 7. The spring is stressed in tension by its frictional engagement with the hub shell wall, and the friction between the spring and the hub shell is relatively small.

When the flyweight 25' is disengaged from the sleeve 26, torque is transmitted from the hub shell 7 to the sleeve 16 by the spring 17 which is stressed in compression so that the contact friction between the free end of the spring and the hub shell wall is relatively high, and much higher than the friction during the fast movement of the sleeve 16 when driven by the centrifugal weight 25' by way of the friction coupling between the sleeve and the projection 41. The torque transmitted by the last mentioned friction coupling during shifting into high gear is small as compared to the torque transmitted between the hub shell 7 and the sleeve 16 when the hub is being shifted to the low-gear position.

The centrifugal governor of the invention therefore needs but a single flyweight 25', small enough to fit into a hub shell 7 of normal diameter.

What is claimed is:

1. In a centrifugally controlled, automatically shifting two-speed hub for a bicycle or like vehicle including a shaft (1) having an axis; a hub shell (7) mounted on the shaft for rotation about said axis; an input wheel (3); a drive transmission operatively interposed between said input wheel and said shell and including two transmission elements (2, 11) connected for rotation at different speeds when said input wheel is turned, and two overrunning clutches (5, 6; 12, 28) respectively associated with said transmission elements and interposed between the associated transmission elements and said shell for driving the shell at two different speeds; and centrifugal governor means for operating one of said overrunning clutches, the improvement in the governor means which comprises:

(a) a support (24') rotatable on said shaft about said axis;
    (b) step-up transmission means (19, 21, 21a, 23) interposed between said support and said hub shell for rotating said support about said shaft in the direction of rotation of the hub shell at a rotary speed higher than the speed of said hub shell, when the hub shell rotates about said axis;
    (c) a flyweight (25') movable on said support toward and away from said axis;
    (d) yieldably resilient biasing means (27') biasing said flyweight toward said axis;
    (e) a shifting member (16) rotatable about said axis;
    (f) engagement means (41) on said flyweight engageable with said shifting member for rotating the latter at the speed of said support when said flyweight moves away from said axis against the restraint of said biasing means;
    (g) a control member (13) rotatable about said axis and axially movable;
    (h) operating means (18) on said control member for operating said one overrunning clutch in response to axial movement of said control member;
    (i) engaged thread means (15) on said members for moving said control member axially relative to said shifting member when said members rotate relatively to each other;
    (j) securing means (37, 38) axially securing said shifting member during axial movement of said control member;
    (k) first yieldable coupling means (17) coupling said shifting member to said hub shell for joint rotation; and
    (l) second yieldable coupling means (14) coupling said control member to the transmission element associated with said one overrunning clutch for joint rotation.

2. In a hub as set forth in claim 1, said drive transmission including a sun gear (10) fastened to said shaft, a ring gear (11) coaxial with said sun gear, a planet carrier (2), and a planet gear (4) rotatably mounted on said planet carrier in simultaneous meshing engagement with said sun gear and said ring gear, said planet carrier and said ring gear constituting said transmission elements, said one overrunning clutch being associated with said ring gear, the rotary speed of said support being higher than the rotary speed of said ring gear when any one of said overrunning clutches is engaged.

3. In a hub as set forth in claim 1, said securing means including means (44, 45) holding said support in an axially fixed position on said shaft, and cooperating abutment means (37, 38) on said shifting member and on said support.

4. In a hub as set forth in claim 3, said abutment means including a ring member (38) on said shifting member and a disc member (37) on said support, said shifting member being tubular, and said support being received in said shifting member.

References Cited

UNITED STATES PATENTS

| 3,143,005 | 8/1964 | Schwerdhofer | 74—752 |
| 3,147,641 | 9/1964 | Schwerdhofer | 74—750 |
| 3,215,002 | 11/1965 | Schwerdhofer | 74—750 |
| 3,438,283 | 4/1969 | Schwerdhofer | 74—750 |
| 3,286,549 | 11/1966 | Schwerdhofer | 74—752 |

ARTHUR T. McKEON, Primary Examiner

U.S. Cl. X.R.

74—750